US012798735B2

United States Patent

(12) Lu et al.

(10) Patent No.: US 12,798,735 B2
(45) Date of Patent: Nov. 17, 2026

(54) BATTERY CONTROL METHOD FOR INTELLIGENT FISHING ROD SYSTEM, CONTROLLER, AND STORAGE MEDIUM

(71) Applicant: SHENZHEN AMPERE TIME DIGITAL ENERGY TECHNOLOGY CO., LTD., Shenzhen (CN)

(72) Inventors: Haijun Lu, Shenzhen (CN); Menglong Zhao, Shenzhen (CN); Rongxing Zhang, Shenzhen (CN); Xiaohui Luo, Shenzhen (CN)

(73) Assignee: SHENZHEN AMPERE TIME DIGITAL ENERGY TECHNOLOGY CO., LTD., Shenzhen (CN)

( * ) Notice: Subject to any disclaimer, the term of this patent is extended or adjusted under 35 U.S.C. 154(b) by 21 days.

(21) Appl. No.: 18/979,212

(22) Filed: Dec. 12, 2024

(65) Prior Publication Data

US 2025/0196980 A1 Jun. 19, 2025

Related U.S. Application Data

(63) Continuation of application No. PCT/CN2024/107024, filed on Jul. 23, 2024.

(30) Foreign Application Priority Data

Dec. 18, 2023 (CN) ......................... 202311739348.8

(51) Int. Cl.
*B63B 79/15* (2020.01)
*A01K 97/10* (2006.01)
(Continued)

(52) U.S. Cl.
CPC .............. *B63B 79/15* (2020.01); *A01K 97/10* (2013.01); *B63B 79/40* (2020.01); *B63H 20/007* (2013.01)

(58) Field of Classification Search
CPC ......... B63B 79/15; B63B 79/40; A01K 97/10; A01K 97/125; A01K 97/12; B63H 20/007; H02J 7/971; H02J 7/855
See application file for complete search history.

(56) References Cited

U.S. PATENT DOCUMENTS 6,032,087 A * 2/2000 Yamamoto ........... G05D 1/0206 701/1
12,201,100 B1 * 1/2025 Yu ........................ A01K 89/015
(Continued)

FOREIGN PATENT DOCUMENTS

CN 104991571 A 10/2015
CN 103448877 B 11/2015
(Continued)

OTHER PUBLICATIONS

International search report issued in corresponding international application No. PCT/CN2024/107024 dated Oct. 2, 2024.
(Continued)

*Primary Examiner* — Rachid Bendidi
*Assistant Examiner* — Hana Victoria Hall
(74) *Attorney, Agent, or Firm* — HAUPTMAN HAM, LLP

(57) ABSTRACT

A battery control method for an intelligent fishing rod system, a controller, and a storage medium are provided. The method includes the following. An environmental parameter sent by a sensor module is received, and if a bite signal sent by the sensor module is not received, an energy storage battery is controlled based on the environmental parameter. If the bite signal sent by the sensor module is received, the energy storage battery is controlled to supply power to a stabilizer and a drag force parameter sent by the sensor module is obtained, where the drag force parameter is obtained by detecting, by the sensor module, a fishing rod controlled by the stabilizer. The energy storage battery is
(Continued)

100

APPLICATION SCENARIO controlled based on the environmental parameter and the drag force parameter.

17 Claims, 7 Drawing Sheets

(51) Int. Cl.

| | |
|---|---|
| ***B63B 79/40*** | (2020.01) |
| ***B63H 20/00*** | (2006.01) |

(56) References Cited

U.S. PATENT DOCUMENTS

| | | | | |
|---|---|---|---|---|
| 12,277,611 | B2 * | 4/2025 | Yasuda | G06Q 50/02 |
| 2011/0213570 | A1 | 9/2011 | Rayor et al. | |
| 2016/0353725 | A1 | 12/2016 | Worley, III | |

FOREIGN PATENT DOCUMENTS

| | | | | | |
|---|---|---|---|---|---|
| CN | 107463187 | A | | 12/2017 | |
| CN | 112056282 | A | | 12/2020 | |
| CN | 112493215 | A | | 3/2021 | |
| CN | 215416318 | U | | 1/2022 | |
| CN | 216931515 | U | * | 7/2022 | |
| CN | 115047360 | A | | 9/2022 | |
| CN | 115053870 | A | | 9/2022 | |
| CN | 115195948 | A | * | 10/2022 | B63B 35/00 |
| JP | 2000201602 | A | | 7/2000 | |
| KR | 20220109827 | A | | 8/2022 | |
| WO | WO-2020187475 | A1 | * | 9/2020 | A01K 97/125 |

OTHER PUBLICATIONS

Deng Wujin, "New Electric Intelligent Fishing Rod" Electronic World, Issue 15, Aug. 15, 2019, p. 143.

The first office action issued in corresponding CN application No. 202311739348.8 dated Jan. 27, 2024.

Notice of allowance issued in corresponding CN application No. 202311739348.8 dated Mar. 4, 2024.

Extended European Search Report issued in corresponding EP application No. 24812360.6 dated Nov. 10, 2025.

Notice of Reasons for Refusal issued in corresponding JP application No. 2024-574688 dated Mar. 6, 2026.

* cited by examiner

BATTERY CONTROL METHOD FOR INTELLIGENT FISHING ROD SYSTEM, CONTROLLER, AND STORAGE MEDIUM

CROSS-REFERENCE

This application is a continuation of International Application No. PCT/CN2024/107024, filed Jul. 23, 2024, which claims priority to Chinese Patent Application No. 202311739348.8, filed Dec. 18, 2023, the entire disclosures of both of which are incorporated herein by reference.

TECHNICAL FIELD

The present disclosure relates to the field of new energy battery control management, and in particular, to a battery control method for an intelligent fishing rod system, a controller, and a storage medium.

BACKGROUND

Sea fishing is a relaxing and exciting sport, especially when driving a fishing boat out to the sea. For those anglers, it is even more of a challenge to stand on the fishing boat to fish, which brings more joy in sea fishing. Sea fishing has become popular among the public. However, when fishing, especially sea fishing, a fishing rod swings constantly and the fishing boat moves under the impact of various factors, for example, sea breeze. In this case, stability is difficult to maintain, thereby increasing the difficulty of fishing, resulting in low efficiency and poor experience in fishing. To solve the above problem, an electric device may be used to stabilize the fishing rod. However, under the sea fishing scenario, existing electric devices are unable to solve the swinging problem caused by various factors such as sea breeze and sea waves, and continuous operation of the devices will lead to high power consumption.

SUMMARY

In a first aspect, embodiments of the disclosure provide a battery control method for an intelligent fishing rod system, which is applied to a controller of the intelligent fishing rod system. The intelligent fishing rod system further includes a fishing rod, a sensor module, a stabilizer, and an energy storage battery. The sensor module is configured to detect an environmental parameter, the stabilizer is configured to stabilize the fishing rod, and the energy storage battery is configured to supply power to the sensor module and the controller. The method includes the following. The environmental parameter sent by the sensor module is received, and if a bite signal sent by the sensor module is not received, the energy storage battery is controlled based on the environmental parameter. If the bite signal sent by the sensor module is received, the energy storage battery is controlled to supply power to the stabilizer and a drag force parameter sent by the sensor module is obtained, where the drag force parameter is obtained by detecting, by the sensor module, the fishing rod controlled by the stabilizer. The energy storage battery is controlled based on the environmental parameter and the drag force parameter.

In a second aspect, embodiments of the disclosure provide a controller. The controller includes a processor, a memory, a communication interface, and one or more programs. The one or more programs are stored in the memory and configured to be executed by the processor. The one or more programs are loaded by the processor to execute part of or all of the method in the first aspect.

In a third aspect, embodiments of the disclosure provide a non-transitory computer-readable storage medium storing a computer program used for electronic data interchange (EDI). The computer program causes a computer to execute part of or all of the method in the first aspect.

BRIEF DESCRIPTION OF THE DRAWINGS

In order to describe technical solutions of embodiments of the disclosure more clearly, the following will give a brief introduction to the accompanying drawings used for describing the embodiments. Apparently, the accompanying drawings hereinafter described are some embodiments of the present disclosure. Based on these drawings, those of ordinary skill in the art can also obtain other drawings without creative effort.

DETAILED DESCRIPTION

In order to enable those skilled in the art to better understand the solutions of the disclosure, the following will clearly and completely illustrate technical solutions of embodiments of the disclosure with reference to the accompanying drawings of embodiments of the disclosure. Apparently, embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

The terms “first”, “second”, and the like in the description, claims of the present disclosure, and the above accompanying drawings are used for distinguishing different objects, rather than for describing a specific order. In addition, the terms “include”, “have”, and any variations thereof are intended to cover non-exclusive inclusions. For example, a process, method, system, product, or apparatus that includes a series of steps or units is not limited to the listed steps or units, but optionally further includes steps or units not listed, or optionally further includes other steps or units inherent to the process, method, product, or apparatus.

Reference to "embodiment" herein means that a particular feature, structure, or characteristic described in conjunction with the embodiment may be included in at least one embodiment of the present disclosure. The presence of the term at each place in the specification does not necessarily refer to the same embodiment, nor does it refer to a separate or alternative embodiment that is mutually exclusive of other embodiments. It may be understood by those skilled in the art, both explicitly and implicitly, that the embodiments described herein may be combined with other embodiments.

Embodiments of the disclosure will be described with reference to the accompanying drawings in the following.

Figure 1:
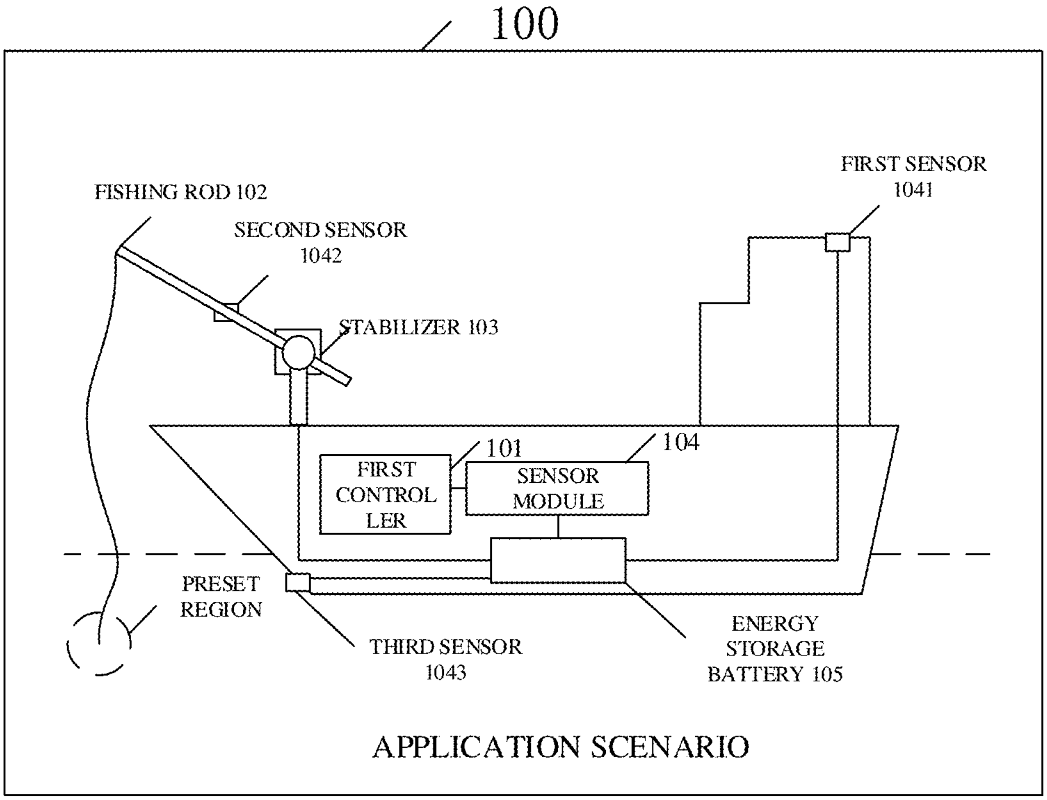
FIG. 1 is a schematic diagram of an application scenario of a battery control method for an intelligent fishing rod system provided in an embodiment of the disclosure.

Reference is made to FIG. 1, which is a schematic diagram of an application scenario of a battery control method for an intelligent fishing rod system provided in an embodiment of the disclosure. An application scenario 100 includes a first controller 101, a fishing rod 102, a stabilizer 103, a sensor module 104, and an energy storage battery 105. The sensor module 104 includes a first sensor 1041, a second sensor 1042, and a third sensor 1043. The first sensor 1041 is configured to obtain an environmental parameter, the second sensor 1042 is configured to obtain, after the stabilizer is activated, a drag force parameter indicating a degree to which the fishing rod is dragged by a fishing line. The third sensor 1043 is configured to detect a target below the water surface through sonar signals or other means. When the target is in a preset region, the third sensor 1043 sends a bite signal to the first controller 101.

The first controller 101 is configured to receive the environmental parameter sent by the first sensor 1041. When the bite signal sent by the third sensor 1043 is not received, the first controller 101 controls the energy storage battery 105 to supply power to the stabilizer 103 based on the environmental parameter sent by the first sensor 1041, so that the stabilizer 103 operates to maintain the stability of the fishing rod 102. When the bite signal sent by the third sensor 1043 is received, the first controller 101 controls the energy storage battery 105 to supply power to the stabilizer 103, so that the stabilizer 103 operates. After the stabilizer 103 starts to operate, the first controller 101 receives the drag force parameter sent by the second sensor 1042, and controls the energy storage battery 105 to supply power to the stabilizer 103 based on the environmental parameter and the drag force parameter, so that the stabilizer 103 operates to maintain the stability of the fishing rod 102.

It may be seen that, the way that the energy storage battery supplies power to the stabilizer is determined based on the bite signal, the environmental parameter, and the drag force parameter sent by the sensor. In a case where the bite signal is not received, the energy storage battery is controlled to supply power to the stabilizer based on the environmental parameter. In a case where the bite signal is received, the energy storage battery is controlled to supply power to the stabilizer based on the environmental parameter and the drag force parameter. In this way, the problem of unstable fishing rod in fishing scenarios is solved and the power consumption of the system is reduced.

Figure 2:
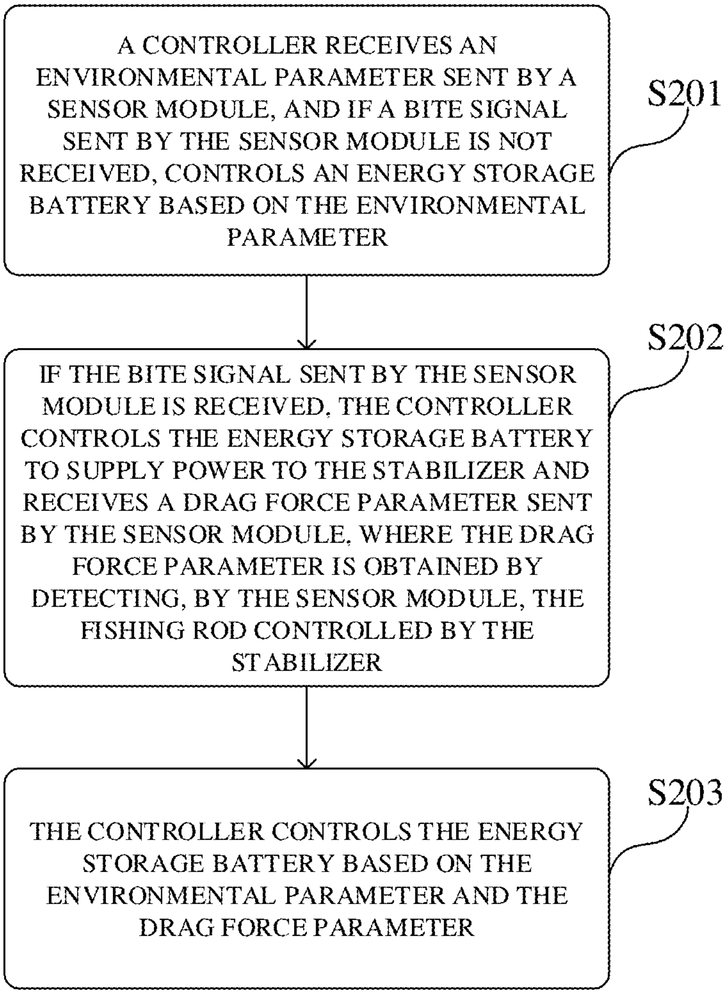
FIG. 2 is a schematic flow chart of a battery control method for an intelligent fishing rod system provided in an embodiment of the disclosure.

Reference is made to FIG. 2, which is a schematic flow chart of a battery control method for an intelligent fishing rod system provided in an embodiment of the disclosure. The method may be implemented in the application scenario illustrated in FIG. 1. As illustrated in FIG. 2, the method includes operations at S201-S203.

At S201, a controller receives an environmental parameter sent by a sensor module, and if a bite signal sent by the sensor module is not received, controls an energy storage battery based on the environmental parameter.

Specifically, the environmental parameter is detected by a sensor configured to detect the environmental parameter in the sensor module. The environmental parameter may specifically include a wind force parameter and a wind direction parameter. The wind force parameter represents a wind speed of a wind force that may affect the stability of the fishing rod. The wind direction parameter represents a direction corresponding to the wind force parameter. The bite signal is obtained by a sensor configured to detect sonar signals below the water surface in the sensor module. When the above sensor detects that a target is in a preset region, the sensor sends the bite signal to the controller. The preset region may be determined based on a region within a preset range of a fishhook of the fishing rod.

In a possible embodiment, the intelligent fishing rod system further includes a hull and a trolling motor, and the environmental parameter includes at least one of the wind force parameter and the wind direction parameter. If the bite signal sent by the sensor module is not received, the energy storage battery is controlled based on the environmental parameter as follows. An acting force level of the wind force parameter is determined, and if the wind force parameter is at a first acting force level, the energy storage battery is controlled to supply power to the stabilizer at a first power supply ratio, where the acting force level represents a degree to which the fishing rod is affected by external forces, and a greater impact indicates a higher acting force level. If the wind force parameter is at a second acting force level and the wind direction parameter indicates that the direction of the hull needs to be adjusted, the energy storage battery is controlled to stop supplying power to the stabilizer and the energy storage battery is controlled to supply power to the trolling motor at a second power supply ratio, where the second acting force level is higher than the first acting force level.

At S202, if the bite signal sent by the sensor module is received, the controller controls the energy storage battery to supply power to the stabilizer and receives a drag force parameter sent by the sensor module, where the drag force parameter is obtained by detecting, by the sensor module, the fishing rod controlled by the stabilizer.

Specifically, if the bite signal sent by the sensor module is received, it proves that a fish enters the preset region, and the fish is likely to bite at any time. Therefore, the energy storage battery is controlled to supply power to the stabilizer, and the drag force parameter sent by the sensor module is received at the same time. The sensor that obtains the drag force parameter is disposed on the fishing rod, and the sensor is configured to detect the drag force acting on the fishing rod generated by the struggle of the fish after the fish bites.

At S203, the controller controls the energy storage battery based on the environmental parameter and the drag force parameter.

Specifically, when the bite signal sent by the sensor module is received, rules of power supply of the energy storage battery need to be determined based on the comprehensive impact of the environmental parameter and the drag force parameter.

In the method in the embodiment of the disclosure, the way that the energy storage battery supplies power to the stabilizer is determined based on the bite signal, the environmental parameter, and the drag force parameter sent by the sensor. In a case where the bite signal is not received, the energy storage battery is controlled to supply power to the stabilizer based on the environmental parameter. In a case where the bite signal is received, the energy storage battery is controlled to supply power to the stabilizer based on the environmental parameter and the drag force parameter. In this way, the problem of unstable fishing rod in fishing scenarios is solved and the power consumption of the system is reduced.

Figure 3:
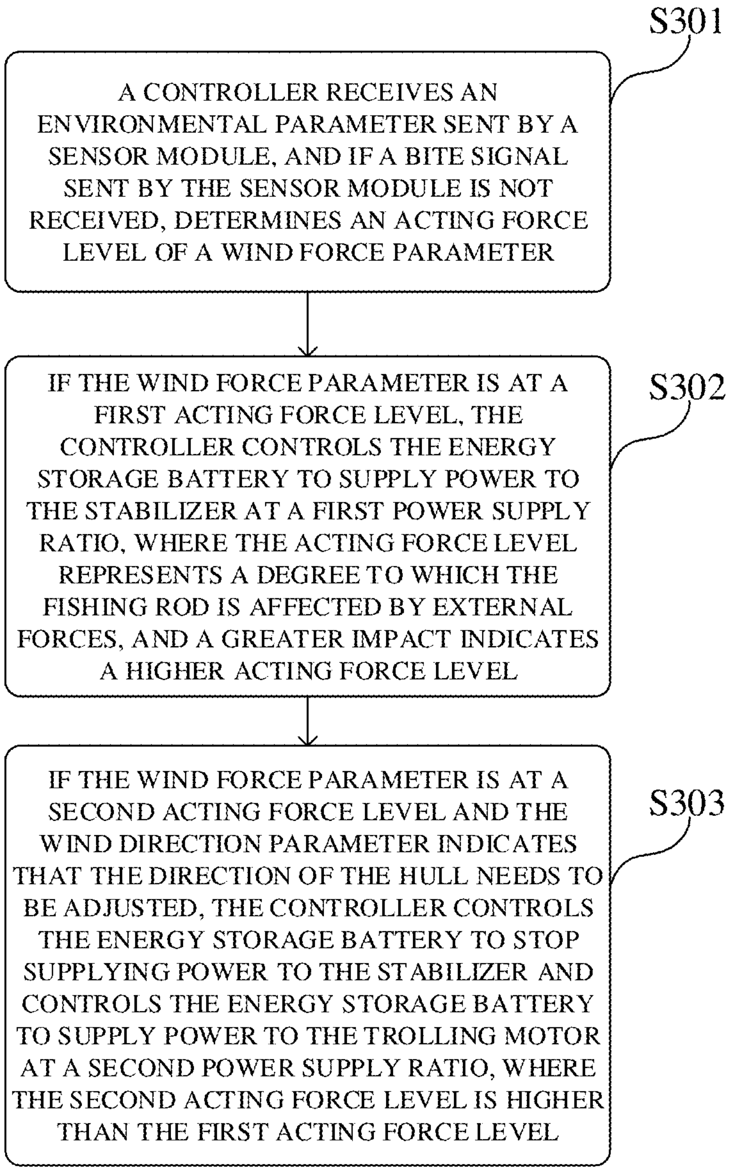
FIG. 3 is a schematic flow chart of another battery control method for an intelligent fishing rod system provided in an embodiment of the disclosure.

In the above embodiment, when the energy storage battery is controlled by the controller, a situation where the bite signal is received and a situation where the bite signal is not received are described. In view of this, in a case where the bite signal is not received, an embodiment of the disclosure further provides in detail another battery control method for an intelligent fishing rod system. Reference is made to FIG. 3, which is a schematic flow chart of another battery control method for an intelligent fishing rod system provided in an embodiment of the disclosure. The method may be implemented in the application scenario illustrated in FIG. 1. As illustrated in FIG. 3, operations at S301-S303 are included.

At S301, a controller receives an environmental parameter sent by a sensor module, and if a bite signal sent by the sensor module is not received, determines an acting force level of a wind force parameter.

Specifically, the method in this embodiment of the disclosure is executed on the premise where the controller does not receive the bite signal sent by the sensor module described in the operation at S201. For a detailed description of the controller receiving the environmental parameter sent by the sensor module, please refer to the relevant description of the operation at S201, which will not be repeated herein.

At S302, if the wind force parameter is at a first acting force level, the controller controls the energy storage battery to supply power to the stabilizer at a first power supply ratio, where the acting force level represents a degree to which the fishing rod is affected by external forces, and a greater impact indicates a higher acting force level.

Specifically, the acting force level of the wind force parameter is used to represent the intensity of the wind force. A higher acting force level represents a greater intensity of the wind force. Specific values of the acting force levels may be characterized by acting forces exerted on the fishing rod caused by wind forces with specific wind speeds. Exemplarily, an acting force exerted on the fishing rod caused by a wind force with a wind speed ranging from 1.6 m/s to 5.4 m/s corresponds to the first acting force level, and an acting force exerted on the fishing rod caused by a wind force with a wind speed ranging from 5.5 m/s to 8.0 m/s corresponds to the second acting force level, and an acting force exerted on the fishing rod caused by a wind force with a wind speed of 8.1 m/s and above corresponds to the third acting force level.

When the wind force parameter is at the first acting force level, the fishing rod will be slightly affected, and the controller controls the energy storage battery to supply power to the stabilizer at the first power supply ratio, which is a lower power supply ratio. With the power supply of the first power supply ratio, the stabilizer operates under a non-fully-loaded condition, which is able to ensure the stability of the fishing rod under the impact of the wind force at the first acting force level. The first power supply ratio is determined based on the maximum power supply power of the energy storage battery. Specifically, it may be 10%, 20%, or other proportions of the maximum power supply power.

At S303, if the wind force parameter is at a second acting force level and the wind direction parameter indicates that the direction of the hull needs to be adjusted, the controller controls the energy storage battery to stop supplying power to the stabilizer and controls the energy storage battery to supply power to the trolling motor at a second power supply ratio, where the second acting force level is higher than the first acting force level.

Figure 4:
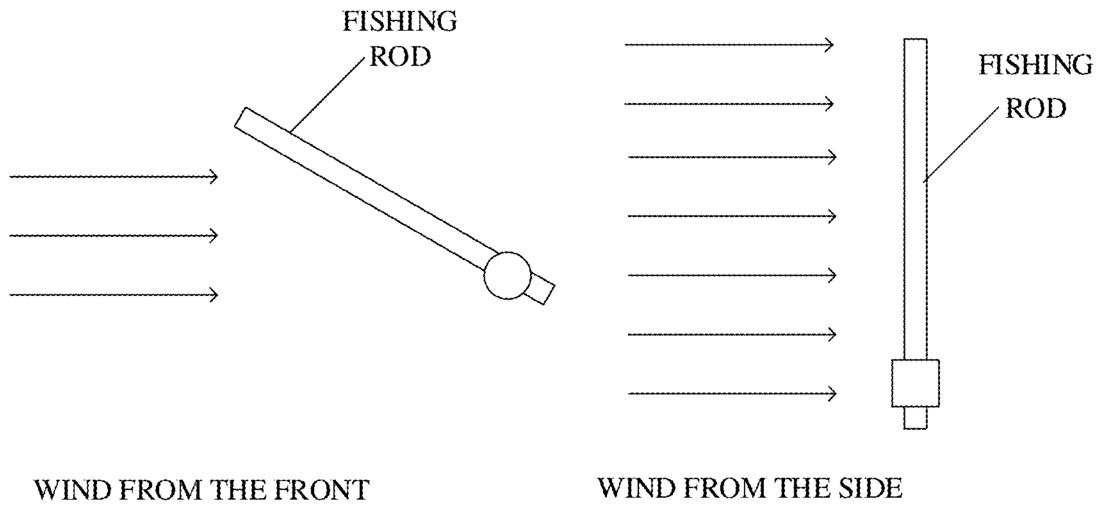
FIG. 4 is a schematic diagram of force analysis of a fishing rod provided in an embodiment of the disclosure.
Figure 5:
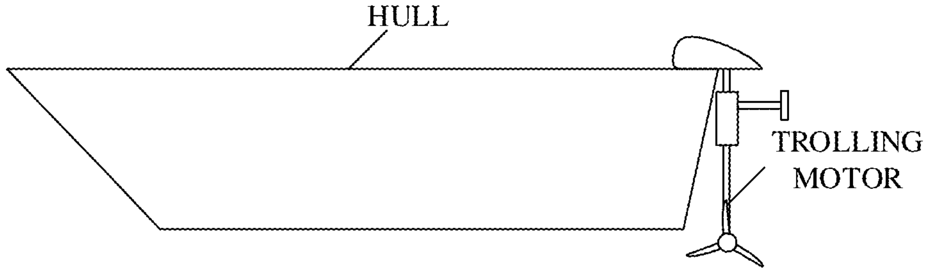
FIG. 5 is a schematic structural diagram of a hull and a trolling motor provided in an embodiment of the disclosure.

Specifically, reference is made to FIG. 4, which is a schematic diagram of force analysis of a fishing rod provided in an embodiment of the disclosure. When the fishing rod is in a fishing state, the fishing rod is placed at a relatively small angle to the water surface, and the fishing rod is less affected by the wind blowing from the front than by the wind blowing from the side. Therefore, when the side of the fishing rod is affected by the wind at the second acting force level, the direction of the hull needs to be adjusted so that the wind at a higher acting force level blows from the front or back of the fishing rod. In this way, the impact on the fishing rod by the wind is reduced under the environment having the same wind force. Reference is made to FIG. 5, which is a schematic structural diagram of a hull and a trolling motor provided in an embodiment of the disclosure. When the wind force parameter is at the second acting force level, the energy storage battery is controlled to stop supplying power to the stabilizer and to supply power to the trolling motor at the second power supply ratio. In this way, the trolling motor can adjust the direction of the hull without changing the position of the hull.

Furthermore, the sum of the first power supply ratio, the second power supply ratio, the power supply ratio for the controller and the sensor module is less than 100%. That is, when the energy storage battery supplies power to the stabilizer at the first power supply ratio, supplies power to the trolling motor at the second power supply ratio, and supplies power to the controller and the sensor module, the load is less than 100% of the maximum load of the energy storage battery.

Optionally, in a case where the wind force parameter is at a level lower than the first acting force level, the wind force has less impact on the fishing rod, and the fishing rod can remain stable even if the energy storage battery does not supply power to the stabilizer. Therefore, in a case where the wind force parameter is at a level lower than the first acting force level, the controller controls the energy storage battery not to supply power to the stabilizer.

By implementing the method in the embodiment of the disclosure, in a case where the bite signal is not received, the energy storage battery is controlled to supply power to the stabilizer based on the environmental parameter obtained by the sensor module, so that the stability of the fishing rod is ensured. Meanwhile, in a case where the wind force parameter is at the second acting force level and the wind direction parameter indicates that the direction of the hull needs to be adjusted, the energy storage battery is controlled to stop supplying power to the stabilizer when the hull is adjusted, thereby reducing the power consumption of the energy storage battery and extending the battery life of the intelligent fishing rod system.

In a possible embodiment, after the acting force level of the wind force parameter is determined, and if the wind force parameter is at the first acting force level, the energy storage battery is controlled to supply power to the stabilizer at the first power supply ratio, the method further includes the following. A first horizontal tilt angle of the fishing rod is calculated based on the wind force parameter and the wind direction parameter, where the first horizontal tilt angle represents a deflection degree of the fishing rod in a horizontal direction caused by a wind force. A control intensity of the stabilizer is determined based on the first horizontal tilt angle, where a larger first horizontal tilt angle indicates a greater control intensity. A first control torque of the stabilizer is determined based on the control intensity and a control direction, and the energy storage battery is controlled to supply power to the stabilizer at the first power supply ratio to make the stabilizer operate based on the first control torque, where the control direction is opposite to a direction indicated by the wind direction parameter.

Specifically, the horizontal tilt angle represents the deflection degree of the fishing rod in the horizontal direction in unit time caused by the wind force under the current wind force parameter. The horizontal tilt angle may be calculated by the following formula.

$$C = \frac{(F - A) \times T \times D}{2mR}$$

C represents the horizontal tilt angle, and F represents an equivalent acting force in the horizontal direction under the action of wind with the current wind force parameter and wind direction parameter. A is a resistance constant, T is a unit time constant, D is a directional parameter, m is the mass of the fishing rod, and R is the length of the fishing rod. If the direction of the equivalent acting force in the horizontal direction under the action of wind with the current wind force parameter and wind direction parameter is horizontal rightward, D=1. If the direction of the equivalent acting force in the horizontal direction under the action of wind with the current wind force parameter and wind direction parameter is horizontal leftward, D=−1.

If the wind force parameter is at the first acting force level, the energy storage battery supplies power to the stabilizer at a first power supply ratio. The controller then calculates a first control torque based on the first horizontal tilt angle, and controls the stabilizer to rotate the fishing rod based on the first control torque. In this way, deviation of the fishing rod by the first horizontal tilt angle caused by the wind force may be offset, thereby ensuring that the fishing rod remains stable.

By implementing the method in the embodiment of the disclosure, it may be seen that by controlling the energy storage battery to supply power to the stabilizer at the first power supply ratio and calculating the first control torque based on the environmental parameter sent by the sensor module, the stabilizer is controlled to operate based on the first control torque, which ensures that the fishing rod remains stable under the impact of the wind force at the first acting force level.

In a possible embodiment, before the energy storage battery is controlled to stop supplying power to the stabilizer, the method further includes the following. The stabilizer is controlled to vibrate at a preset vibration intensity, and the stabilizer is determined to vibrate for a preset duration. After the energy storage battery is controlled to supply power to the trolling motor at the second power supply ratio, the method further includes the following. A target direction of the hull is calculated based on the wind direction parameter, and the trolling motor is controlled to adjust the direction of the hull towards the target direction. The energy storage battery is controlled to stop supplying power to the trolling motor after the hull is adjusted to the target direction.

Specifically, when the wind force parameter is at the second acting force level and the wind direction parameter indicates that the direction of the hull needs to be adjusted, the system will temporarily stop fishing and move the hull toward the target direction to minimize the impact of the wind at the second acting force level on the fishing rod. At this time, fishing needs to be temporarily stopped, and the stabilizer is controlled to vibrate at the preset vibration intensity. The stabilizer is ensured to vibrate for the preset duration, so as to prompt the user to temporarily retract the fishing rod and stop fishing. The target direction of the hull is calculated based on the wind direction parameter, where the target direction refers to the same direction as the wind direction or the direction opposite to the wind direction. When the direction of the hull is adjusted to the target direction, the power supply to the trolling motor is stopped.

By implementing the method in the embodiment of the disclosure, it may be seen that by controlling the stabilizer to vibrate and then stopping the power supply, the user is prompted to timely retract the fishing rod, which improves the intelligence of the fishing rod system. When the trolling motor adjusts the position of the hull, the power supply to the stabilizer is stopped. After the position of the hull is adjusted, the power supply to the trolling motor is stopped. In this way, power consumption of the energy storage battery is reduced and the battery life of the intelligent fishing rod system is extended.

In a possible embodiment, the target direction of the hull is calculated based on the wind direction parameter as follows. A first direction that is the same as a wind direction indicated by the wind direction parameter and a second direction that is opposite to the wind direction indicated by the wind direction parameter are obtained based on the wind direction parameter. A first angle difference between a current direction of the hull and the first direction is calculated, and a second angle difference between the current direction of the hull and the second direction is calculated. A direction corresponding to a smaller angle difference of the first angle difference and the second angle difference is determined as the target direction.

Specifically, when calculating the target direction of the hull based on the wind direction parameter, the angle difference between the current direction of the hull and the first direction that is the same as the wind direction indicated by the wind direction parameter and the angle difference between the current direction of the hull and the second direction that is opposite to the wind direction indicated by the wind direction parameter need to be calculated. The direction corresponding to a smaller angle difference is determined as the target direction.

Figure 6:
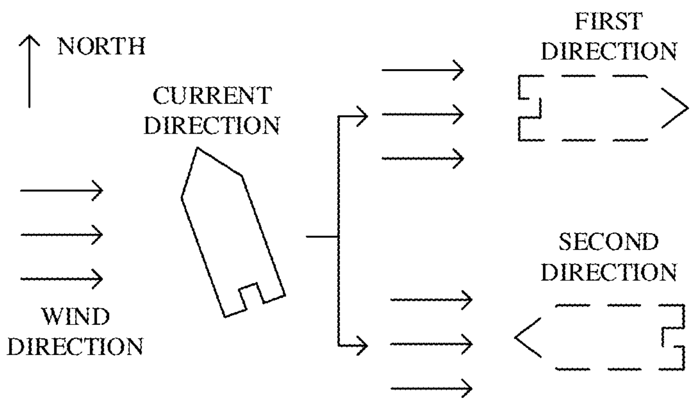
FIG. 6 is a schematic diagram illustrating a change of directions of a hull provided in an embodiment of the disclosure.

Exemplarily, reference is made to FIG. 6, which is a schematic diagram illustrating a change of directions of a hull provided in an embodiment of the disclosure. If the current direction of the hull is northwest and the wind direction parameter indicates that the wind blows to the east, the first direction is the east, and the second direction is the west. Apparently, the angle difference between the current direction and the first direction is significantly greater than the angle difference between the current direction and the second direction. Therefore, in the case illustrated in FIG. 6, the target direction of the hull is the direction indicated by the second direction.

By implementing the method in the embodiment of the disclosure, it may be seen that by determining the direction corresponding to a smaller angle difference as the target direction, the angle that needs to be adjusted when the trolling motor adjusts the direction of the hull is reduced, thereby further reducing the power consumption of the energy storage battery and extending the battery life of the intelligent fishing rod system.

It may be seen that, when the bite signal is not received, the controller determines the way that the energy storage battery supplies power to the stabilizer based on the environmental parameter, which solves the problem of unstable fishing rod swinging in fishing scenarios. Different power supply ratios are matched with different power supply scenarios, thereby reducing the power consumption of the energy storage battery and extending the battery life of the intelligent fishing rod system. The stabilizer is caused to vibrate in situations where the wind force parameter is at a greater acting force level, which helps avoid damage to the stabilizer and other devices under adverse conditions and improves the intelligence of the intelligent fishing rod system in terms of user safety insurance.

Figure 7:
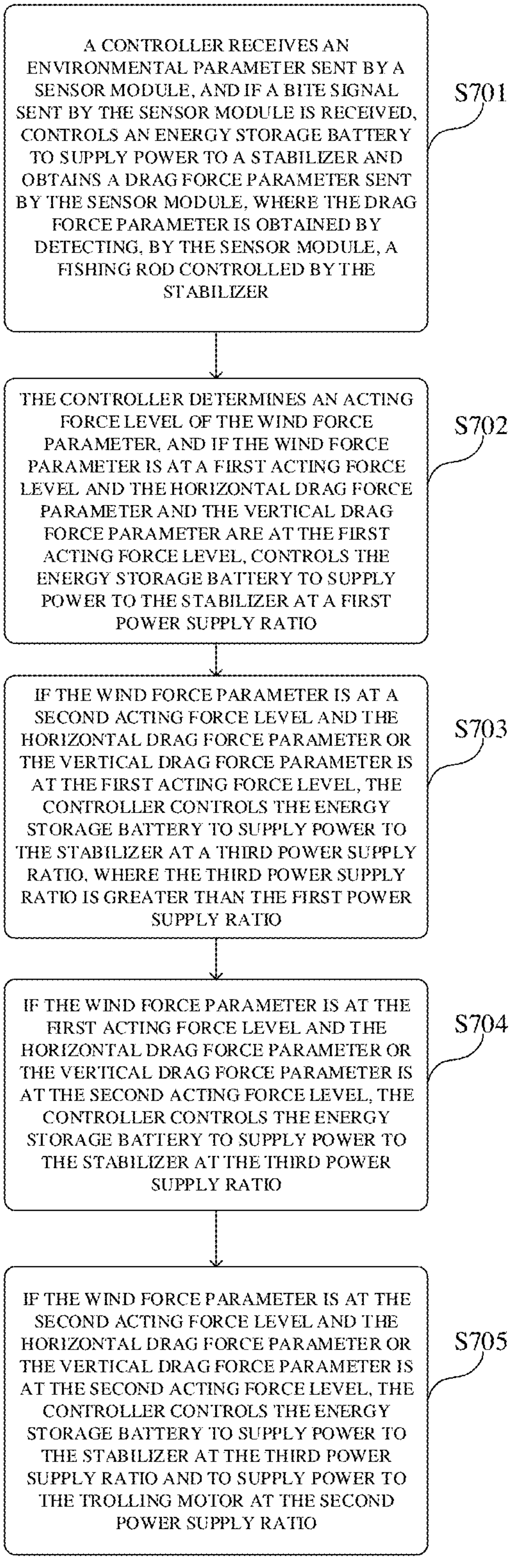
FIG. 7 is a schematic flow chart of another battery control method for an intelligent fishing rod system provided in an embodiment of the disclosure.

Embodiments described above refer to a situation where the bite signal is not received. Based on this, in a situation where the bite signal is received, embodiments of the disclosure further provide another battery control method for an intelligent fishing rod system in detail. The intelligent fishing rod system further includes a hull and a trolling motor, an environmental parameter includes at least one of a wind force parameter and a wind direction parameter, and a drag force parameter includes at least one of a horizontal drag force parameter and a vertical drag force parameter. Reference is made to FIG. 7, which is a schematic flow chart of another battery control method for an intelligent fishing rod system provided in an embodiment of the disclosure. The method may be implemented in the application scenario illustrated in FIG. 1. As illustrated in FIG. 7, operations at S701 to S705 are included.

At S701, a controller receives an environmental parameter sent by a sensor module, and if a bite signal sent by the sensor module is received, controls an energy storage battery to supply power to a stabilizer and obtains a drag force parameter sent by the sensor module, where the drag force parameter is obtained by detecting, by the sensor module, a fishing rod controlled by the stabilizer.

Specifically, the method in this embodiment of the disclosure is executed under the premise that the controller receives the bite signal sent by the sensor module in the operation at S202. For the specific implementation method of the operation at S701, please refer to the relevant descriptions of the operation at S201 and the operation at S202 mentioned above, which will not be repeated herein.

At S702, the controller determines an acting force level of the wind force parameter, and if the wind force parameter is at a first acting force level and the horizontal drag force parameter and the vertical drag force parameter are at the first acting force level, controls the energy storage battery to supply power to the stabilizer at a first power supply ratio.

Specifically, the horizontal drag force parameter and the vertical drag force parameter are also graded according to the acting force level, and the drag force parameter at an acting force level is equal to the wind force parameter at the same acting force level. That is, the horizontal drag force parameter and the wind force parameter of the same acting force level have the same effect on the fishing rod, but differ in direction.

When the wind force parameter is at the first acting force level, and both the horizontal drag force parameter and the vertical drag force parameter are at the first acting force level, both the impact of the wind force and the impact of the drag force on the fishing rod are minimal. The energy storage battery supplying power to the stabilizer at the first power supply ratio can ensure that the stabilizer controls the fishing rod to remain stable under the impact of the wind force and the drag force.

At S703, if the wind force parameter is at a second acting force level and the horizontal drag force parameter or the vertical drag force parameter is at the first acting force level, the controller controls the energy storage battery to supply power to the stabilizer at a third power supply ratio, where the third power supply ratio is greater than the first power supply ratio.

Specifically, when the wind force parameter is at the second acting force level, whether the hull position needs to be adjusted should be determined based on the wind direction parameter. If the hull position needs to be adjusted, the power supply to the stabilizer is stopped, and the trolling motor is powered to adjust the hull position. However, when the bite signal is received, the fishing position cannot be changed. Therefore, when the wind force parameter is at the second acting force level, and the horizontal drag force parameter or vertical drag force parameter is at the first acting force level, the energy storage battery is controlled to supply power to the stabilizer at the third power supply ratio, which is higher than the first power supply ratio. The stabilizer is enabled to operate based on the first control torque with a larger control intensity, so as to counteract the impact of the wind force at the second acting force level and the drag force at the first acting force level on the fishing rod.

Furthermore, the sum of the third power supply ratio, the second power supply ratio, the power supply ratio for the controller and the sensor module is 100%. That is to, when the energy storage battery supplies power to the stabilizer at the third power supply ratio, supplies power to the trolling motor at the second power supply ratio, and simultaneously supplies power to the controller and sensor module, the load ratio of the energy storage battery is 100% of the maximum load.

At S704, if the wind force parameter is at the first acting force level and the horizontal drag force parameter or the vertical drag force parameter is at the second acting force level, the controller controls the energy storage battery to supply power to the stabilizer at the third power supply ratio.

Specifically, when the wind force parameter is at the first acting force level, there is no need to supply power to the trolling motor to adjust the direction of the hull. In this case, if the horizontal drag force parameter or the vertical drag force parameter is at the second acting force level, the stabilizer may operate based on the first control torque with a greater control intensity. Therefore, the energy storage battery needs to be controlled to supply power to the stabilizer at the third power supply ratio, so that the stabilizer can operate at a greater power and satisfy the requirement of the first control torque with a greater control intensity.

At S705, if the wind force parameter is at the second acting force level and the horizontal drag force parameter or the vertical drag force parameter is at the second acting force level, the controller controls the energy storage battery to supply power to the stabilizer at the third power supply ratio and to supply power to the trolling motor at the second power supply ratio.

Specifically, when the wind force parameter is at the second acting force level and the horizontal drag force parameter or the vertical drag force parameter is at the second acting force level, the fishing rod is subjected to a greater wind force and a greater drag force. At this time, the energy storage battery needs to be controlled to supply power to the stabilizer at the third power supply ratio and at the same time supply power to the trolling motor at the second power supply ratio, so that the trolling motor can adjust the direction of the hull within a preset angle range, thereby offsetting the impact of part of the horizontal drag force.

Exemplarily, when the fishing rod is subjected to a leftward horizontal drag force, the energy storage battery is controlled to supply power to the trolling motor at the second power supply ratio, so that the trolling motor controls the hull to move to the left by a corresponding angle, thereby reducing the horizontal drag force on the fishing rod and increasing the vertical drag force on the fishing rod.

Further, after the energy storage battery supplies power to the stabilizer, the controller calculates the first control torque corresponding to the environmental parameter and a second torque corresponding to the drag force parameter based on the environmental parameter and the drag force parameter. The control intensity and the direction of the stabilizer in the horizontal and vertical directions are controlled to ensure that the fishing rod remains stable under the impact of the wind force and the drag force.

By implementing the method of the embodiment of the disclosure, it may be seen that in the situation where the bite signal sent by the sensor module is received, the power supply ratio of the stabilizer is adjusted based on the consideration of the impact of the environmental parameter and the drag force parameter on the fishing rod. The power supply ratio is increased when the fishing rod is greatly affected by the wind force or the drag force, or the trolling motor is started to assist the stabilizer. In this way, the stability of the fishing rod is ensured while the power waste caused by the stabilizer always running at a high power is reduced, thereby extending the battery life of the intelligent fishing rod system.

In a possible embodiment, the intelligent fishing rod system further includes the trolling motor, and the environmental parameter includes at least one of the wind force parameter and the wind direction parameter. The method further includes the following. The acting force level of the wind force parameter is determined, and if the wind force parameter is at a third acting force level, an alert message is sent to a terminal device of a user and an evacuating command is executed, where the third acting force level is greater than the second acting force level, and the evacuating command is used to instruct the energy storage battery to supply power to the trolling motor at the second power supply ratio and to stop supplying power to the stabilizer. The wind force parameter is received continuously, and if the wind force parameter is not at the third acting force level and a recovery signal sent by the terminal device is received, execution of the evacuating command is stopped.

Specifically, when the wind force parameter is at the third acting force level, the impact of the wind force on the fishing rod may exceed the adjustment range of the stabilizer, and the wind force may even cause severe shaking of the hull. At this point, regardless of whether the controller receives the bite signal, the fishing needs to be stopped. Since the entire intelligent fishing rod system is at risk, an alert message needs to be sent to the terminal device of the user, so as to prompt the user to stop fishing and leave the fishing area as soon as possible. By executing the evacuating command, the controller controls the energy storage battery to stop supplying power to the stabilizer, and to supply power to the trolling motor at the second power supply ratio, so that the hull can move out of the current area as soon as possible. The controller continuously obtains the wind force parameter, and if the wind force parameter is no longer at the third acting force level, it indicates that the hull has left the current area. If the controller receives a recovery signal sent by the terminal device of the user, the controller stops executing the evacuating command and the fishing is continued, while the controller reobtains parameters and signals such as the environmental parameter again.

Optionally, the controller may control the energy storage battery to stop supplying power to the sensor module and stop supplying power to the stabilizer at the same time. When the sensor module has been power-off for a second preset duration, the controller controls the energy storage battery to supply power to the sensor module.

By implementing the method in the embodiments of the disclosure, it may be seen that when the wind force parameter is at the third acting force level, the system sends the alert message to the terminal device of the user and executes the evacuating command. The energy storage battery is controlled to supply power to both the stabilizer and the trolling motor until the wind force parameter is no longer at the third acting force level. This process not only improves the intelligence of the intelligent fishing rod system in terms of the user safety insurance, but also avoids damage to the stabilizer and other devices under adverse conditions.

It may be seen that, by considering the impact of the environmental parameter and the drag force parameter on the fishing rod, the energy storage battery is controlled to supply power to the stabilizer, thereby solving the problem of unstable fishing rod swinging in fishing scenarios. By matching different power supply ratios with different power supply scenarios, the power consumption of the energy storage battery is reduced, and the battery life of the intelligent fishing rod system is extended. The stabilizer vibrates when the wind force parameter is at a high acting force level, and the evacuating command is executed when the wind force parameter is at the third acting force level, which helps avoid damage to the stabilizer and other devices under adverse conditions and improves the intelligence of the intelligent fishing rod system in terms of user safety insurance.

Figure 8:
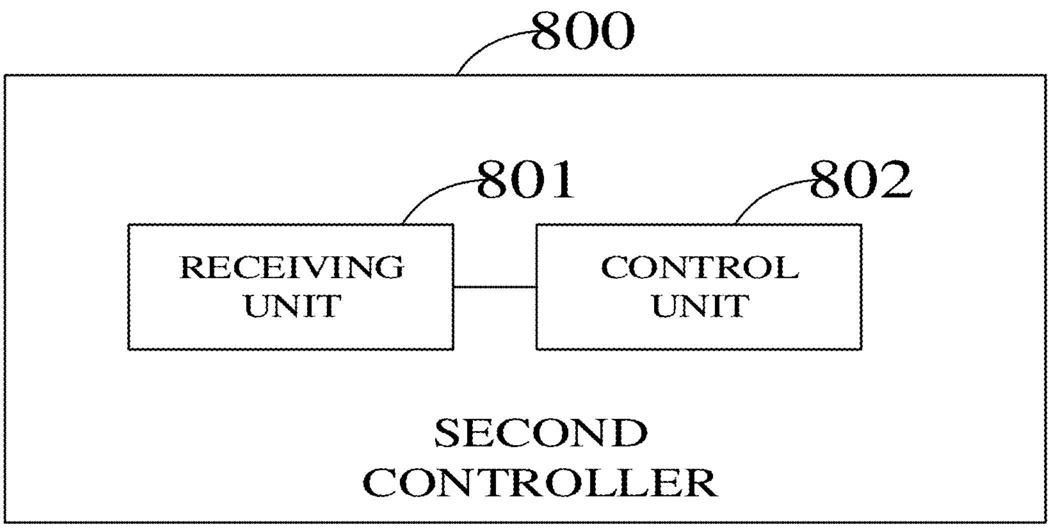
FIG. 8 is a schematic structural diagram of a second controller provided in an embodiment of the disclosure.

Based on the above description of method embodiments, the disclosure further provides a second controller 800. The second controller 800 may be the first controller 101 illustrated in FIG. 1, or may be a computer program (including program codes) operable in a terminal device. The second controller 800 may be applied in the application scenario illustrated in FIG. 1 and execute the method illustrated in FIG. 3. Reference is made to FIG. 8, which is a schematic structural diagram of a second controller provided in an embodiment of the disclosure. The second controller includes a receiving module 801 and a control module 802.

The receiving module 801 is configured to receive the environmental parameter sent by the sensor module, and if a bite signal sent by the sensor module is not received, control the energy storage battery based on the environmental parameter.

The control module 802 is configured to, if the bite signal sent by the sensor module is received, control the energy storage battery to supply power to the stabilizer and obtain a drag force parameter sent by the sensor module, where the drag force parameter is obtained by detecting, by the sensor module, the fishing rod controlled by the stabilizer.

The control module 802 is further configured to control the energy storage battery based on the environmental parameter and the drag force parameter.

In a possible embodiment, the intelligent fishing rod system further includes a hull and a trolling motor, and the environmental parameter includes at least one of a wind force parameter and a wind direction parameter. If the bite signal sent by the sensor module is not received, the energy storage battery is controlled based on the environmental parameter as follows. An acting force level of the wind force parameter is determined, and if the wind force parameter is at a first acting force level, the energy storage battery is controlled to supply power to the stabilizer at a first power supply ratio, where the acting force level represents a degree to which the fishing rod is affected by external forces, and a greater impact indicates a higher acting force level. If the wind force parameter is at a second acting force level and the wind direction parameter indicates that the direction of the hull needs to be adjusted, the energy storage battery is controlled to stop supplying power to the stabilizer and the energy storage battery is controlled to supply power to the trolling motor at a second power supply ratio, where the second acting force level is higher than the first acting force level.

In a possible embodiment, the intelligent fishing rod system further includes a hull and a trolling motor, and the environmental parameter includes at least one of a wind force parameter and a wind direction parameter, and the drag force parameter includes at least one of a horizontal drag force parameter and a vertical drag force parameter. The energy storage battery is controlled based on the environmental parameter and the drag force parameter as follows. An acting force level of the wind force parameter is determined, and if the wind force parameter is at a first acting force level and the horizontal drag force parameter and the vertical drag force parameter are at the first acting force level, the energy storage battery is controlled to supply power to the stabilizer at a first power supply ratio. If the wind force parameter is at a second acting force level and the horizontal drag force parameter or the vertical drag force parameter is at the first acting force level, the energy storage battery is controlled to supply power to the stabilizer at a third power supply ratio, where the third power supply ratio is greater than the first power supply ratio. If the wind force parameter is at the first acting force level and the horizontal drag force parameter or the vertical drag force parameter is at the second acting force level, the energy storage battery is controlled to supply power to the stabilizer at the third power supply ratio. If the wind force parameter is at the second acting force level and the horizontal drag force parameter or the vertical drag force parameter is at the second acting force level, the energy storage battery is controlled to supply power to the stabilizer at the third power supply ratio and to supply power to the trolling motor at the second power supply ratio.

In a possible embodiment, after the acting force level of the wind force parameter is determined, and if the wind force parameter is at the first acting force level, the energy storage battery is controlled to supply power to the stabilizer at the first power supply ratio, the method further includes the following. A first horizontal tilt angle of the fishing rod is calculated based on the wind force parameter and the wind direction parameter, where the first horizontal tilt angle represents a deflection degree of the fishing rod in a horizontal direction caused by a wind force. A control intensity of the stabilizer is determined based on the first horizontal tilt angle, where a larger first horizontal tilt angle indicates a greater control intensity. A first control torque of the stabilizer is determined based on the control intensity and a control direction, and the energy storage battery is controlled to supply power to the stabilizer at the first power supply ratio to make the stabilizer operate based on the first control torque, where the control direction is opposite to a direction indicated by the wind direction parameter.

In a possible embodiment, before the energy storage battery is controlled to stop supplying power to the stabilizer, the method further includes the following. The stabilizer is controlled to vibrate at a preset vibration intensity, and the stabilizer is determined to vibrate for a preset duration. After the energy storage battery is controlled to supply power to the trolling motor at the second power supply ratio, the method further includes the following. A target direction of the hull is calculated based on the wind direction parameter, and the trolling motor is controlled to adjust the direction of the hull towards the target direction. The energy storage battery is controlled to stop supplying power to the trolling motor after the hull is adjusted to the target direction.

In a possible embodiment, the target direction of the hull is calculated based on the wind direction parameter as follows. A first direction that is the same as a wind direction indicated by the wind direction parameter and a second direction that is opposite to the wind direction indicated by the wind direction parameter are obtained based on the wind direction parameter. A first angle difference between a current direction of the hull and the first direction is calculated, and a second angle difference between the current direction of the hull and the second direction is calculated. A direction corresponding to a smaller angle difference of the first angle difference and the second angle difference is determined as the target direction.

In a possible embodiment, the intelligent fishing rod system further includes the trolling motor, and the environmental parameter includes at least one of the wind force parameter and the wind direction parameter. The method further includes the following. The acting force level of the wind force parameter is determined, and if the wind force parameter is at a third acting force level, an alert message is sent to a terminal device of a user and an evacuating command is executed, where the third acting force level is greater than the second acting force level, and the evacuating command is used to instruct the energy storage battery to supply power to the trolling motor at the second power supply ratio and to stop supplying power to the stabilizer. The wind force parameter is received continuously, and if the wind force parameter is not at the third acting force level and a recovery signal sent by the terminal device is received, execution of the evacuating command is stopped.

Figure 9:
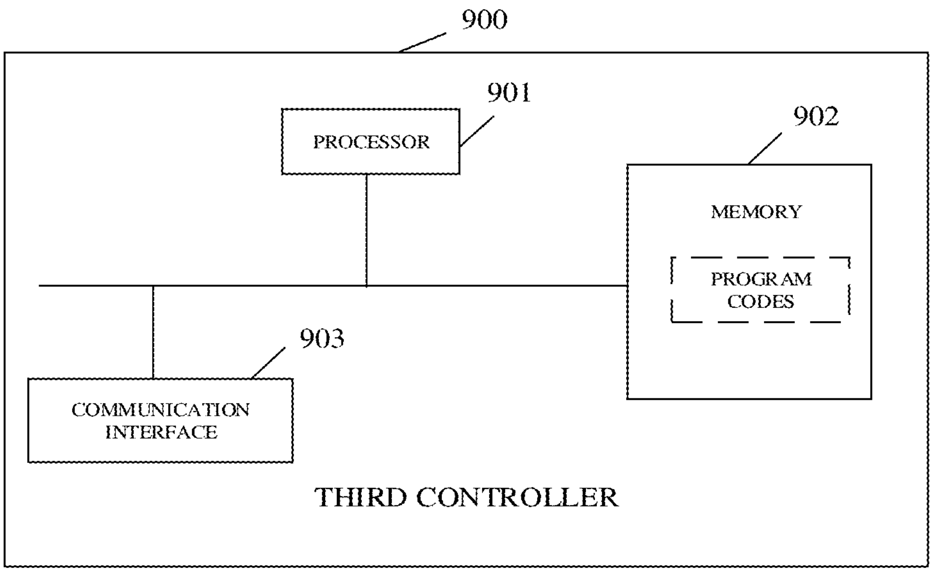
FIG. 9 is a schematic structural diagram of a third controller provided in an embodiment of the disclosure.

Based on the above description of method embodiments and apparatus embodiments, reference is made to FIG. 9, which is a schematic structural diagram of a third controller provided in an embodiment of the disclosure, and the third controller may be the first controller 101 in the application scenario illustrated in FIG. 1. As illustrated in FIG. 9, a third controller 900 described in the embodiment includes a processor 901, a memory 902, a communication interface 903, and one or more programs. The one or more programs are stored in the memory 902 in a form of application codes and are configured to be executed by the processor 901. In the embodiment of the disclosure, the above one or more programs include instructions for executing the following operations.

An environmental parameter sent by a sensor module is received, and if a bite signal sent by the sensor module is not received, an energy storage battery is controlled based on the environmental parameter. If the bite signal sent by the sensor module is received, the energy storage battery is controlled to supply power to a stabilizer and a drag force parameter sent by the sensor module is obtained, where the drag force parameter is obtained by detecting, by the sensor module, a fishing rod controlled by the stabilizer. The energy storage battery is controlled based on the environmental parameter and the drag force parameter.

In a possible embodiment, the intelligent fishing rod system further includes a hull and a trolling motor, and the environmental parameter includes at least one of a wind force parameter and a wind direction parameter. If the bite signal sent by the sensor module is not received, the energy storage battery is controlled based on the environmental parameter as follows. An acting force level of the wind force parameter is determined, and if the wind force parameter is at a first acting force level, the energy storage battery is controlled to supply power to the stabilizer at a first power supply ratio, where the acting force level represents a degree to which the fishing rod is affected by external forces, and a greater impact indicates a higher acting force level. If the wind force parameter is at a second acting force level and the wind direction parameter indicates that the direction of the hull needs to be adjusted, the energy storage battery is controlled to stop supplying power to the stabilizer and the energy storage battery is controlled to supply power to the trolling motor at a second power supply ratio, where the second acting force level is higher than the first acting force level.

In a possible embodiment, the intelligent fishing rod system further includes a hull and a trolling motor, and the environmental parameter includes at least one of a wind force parameter and a wind direction parameter, and the drag force parameter includes at least one of a horizontal drag force parameter and a vertical drag force parameter. The energy storage battery is controlled based on the environmental parameter and the drag force parameter as follows. An acting force level of the wind force parameter is determined, and if the wind force parameter is at a first acting force level and the horizontal drag force parameter and the vertical drag force parameter are at the first acting force level, the energy storage battery is controlled to supply power to the stabilizer at a first power supply ratio. If the wind force parameter is at a second acting force level and the horizontal drag force parameter or the vertical drag force parameter is at the first acting force level, the energy storage battery is controlled to supply power to the stabilizer at a third power supply ratio, where the third power supply ratio is greater than the first power supply ratio. If the wind force parameter is at the first acting force level and the horizontal drag force parameter or the vertical drag force parameter is at the second acting force level, the energy storage battery is controlled to supply power to the stabilizer at the third power supply ratio. If the wind force parameter is at the second acting force level and the horizontal drag force parameter or the vertical drag force parameter is at the second acting force level, the energy storage battery is controlled to supply power to the stabilizer at the third power supply ratio and to supply power to the trolling motor at the second power supply ratio.

In a possible embodiment, after the acting force level of the wind force parameter is determined, and if the wind force parameter is at the first acting force level, the energy storage battery is controlled to supply power to the stabilizer at the first power supply ratio, the method further includes the following. A first horizontal tilt angle of the fishing rod is calculated based on the wind force parameter and the wind direction parameter, where the first horizontal tilt angle represents a deflection degree of the fishing rod in a horizontal direction caused by a wind force. A control intensity of the stabilizer is determined based on the first horizontal tilt angle, where a larger first horizontal tilt angle indicates a greater control intensity. A first control torque of the stabilizer is determined based on the control intensity and a control direction, and the energy storage battery is controlled to supply power to the stabilizer at the first power supply ratio to make the stabilizer operate based on the first control torque, where the control direction is opposite to a direction indicated by the wind direction parameter.

In a possible embodiment, before the energy storage battery is controlled to stop supplying power to the stabilizer, the method further includes the following. The stabilizer is controlled to vibrate at a preset vibration intensity, and the stabilizer is determined to vibrate for a preset duration. After the energy storage battery is controlled to supply power to the trolling motor at the second power supply ratio, the method further includes the following. A target direction of the hull is calculated based on the wind direction parameter, and the trolling motor is controlled to adjust the direction of the hull towards the target direction. The energy storage battery is controlled to stop supplying power to the trolling motor after the hull is adjusted to the target direction.

In a possible embodiment, the target direction of the hull is calculated based on the wind direction parameter as follows. A first direction that is the same as a wind direction indicated by the wind direction parameter and a second direction that is opposite to the wind direction indicated by the wind direction parameter are obtained based on the wind direction parameter. A first angle difference between a current direction of the hull and the first direction is calculated, and a second angle difference between the current direction of the hull and the second direction is calculated. A direction corresponding to a smaller angle difference of the first angle difference and the second angle difference is determined as the target direction.

In a possible embodiment, the intelligent fishing rod system further includes the trolling motor, and the environmental parameter includes at least one of the wind force parameter and the wind direction parameter. The method further includes the following. The acting force level of the wind force parameter is determined, and if the wind force parameter is at a third acting force level, an alert message is sent to a terminal device of a user and an evacuating command is executed, where the third acting force level is greater than the second acting force level, and the evacuating command is used to instruct the energy storage battery to supply power to the trolling motor at the second power supply ratio and to stop supplying power to the stabilizer. The wind force parameter is received continuously, and if the wind force parameter is not at the third acting force level and a recovery signal sent by the terminal device is received, execution of the evacuating command is stopped.

Exemplarily, the above controller may include but is not limited to a processor, a memory, a communication interface, and one or more programs. The above controller may further include an internal storage, a power, an application user side module, etc. Those of ordinary skills in the art may understand that the schematic diagram is only an example of the controller and does not constitute a limitation on the controller, and it may include more or fewer components than shown in the diagram, or a combination of certain components, or different components.

Embodiments of the disclosure further provides a computer storage medium (memory), and the computer storage medium is a memory device used in information processing device, information transmission device, or information reception device to store programs and data. It may be understood that, the computer storage medium herein may include an internal storage medium of the terminal and may also include an extended storage medium supported by the terminal. The computer storage medium provides a storage space, storing an operating system of the terminal. In addition, the storage space further stores computer program instructions suitable for being loaded and executed by a processor, and the instructions may be one or more computer programs (including program codes). The computer storage medium herein may be a high speed RAM or a non-volatile memory, for example, at least one magnetic disk memory. Optionally, the computer storage medium may further be at least one computer storage medium located away from the foregoing processor. In an embodiment, the processor may load and execute one or more instructions stored in the computer storage medium to implement corresponding operations in the above battery control method for an intelligent fishing rod system. The foregoing illustrates the embodiments of the disclosure in detail. The principle and embodiments of the disclosure are illustrated by specific examples. The illustration of the above embodiments is merely used to facilitate understanding of the methods and core concept of the disclosure. For a person skilled in the art, according to the concept of the disclosure, specific embodiments and application ranges may be both changed. Based on the above, the disclosure shall not be understood to be limited to the specification.

What is claimed is:

1. A battery control method for an intelligent fishing rod system, applied to a controller of the intelligent fishing rod system, wherein the intelligent fishing rod system further comprises a fishing rod, a sensor module, a stabilizer, an energy storage battery, a hull, and a trolling motor, wherein the sensor module is configured to detect an environmental parameter, the environmental parameter comprises at least one of a wind force parameter and a wind direction parameter, the stabilizer is configured to stabilize the fishing rod, and the energy storage battery is configured to supply power to the sensor module, to the stabilizer, and to the controller, and the method comprises:

receiving the environmental parameter sent by the sensor module, and in response to not receiving a bite signal sent by the sensor module, controlling a power supply target and a power supply ratio of the energy storage battery based on the environmental parameter; and in response to receiving the bite signal sent by the sensor module, controlling the energy storage battery to supply power to the stabilizer and obtaining a drag force parameter sent by the sensor module, controlling the power supply target and the power supply ratio of the energy storage battery based on the environmental parameter and the drag force parameter, wherein the drag force parameter is obtained by detecting, by the sensor module, the fishing rod controlled by the stabilizer, and the drag force parameter comprises at least one of a horizontal drag force parameter and a vertical drag force parameter, and wherein controlling the power supply target and the power supply ratio of the energy storage battery based on the environmental parameter and the drag force parameter comprises:

determining an acting force level of the wind force parameter, and in response to the wind force parameter being at a first acting force level and the horizontal drag force parameter and the vertical drag force parameter being at the first acting force level, controlling the energy storage battery to supply power to the stabilizer at a first power supply ratio;

in response to the wind force parameter being at a second acting force level and the horizontal drag force parameter or the vertical drag force parameter being at the first acting force level, controlling the energy storage battery to supply power to the stabilizer at a third power supply ratio, wherein the third power supply ratio is greater than the first power supply ratio;

in response to the wind force parameter being at the first acting force level and the horizontal drag force parameter or the vertical drag force parameter being at the second acting force level, controlling the energy storage battery to supply power to the stabilizer at the third power supply ratio; and in response to the wind force parameter being at the second acting force level and the horizontal drag force parameter or the vertical drag force parameter being at the second acting force level, controlling the energy storage battery to supply power to the stabilizer at the third power supply ratio and to supply power to the trolling motor at a second power supply ratio.

2. The method of claim 1, wherein the intelligent fishing rod system further comprises a hull and a trolling motor, and the environmental parameter comprises at least one of a wind force parameter and a wind direction parameter, wherein in response to not receiving the bite signal sent by the sensor module, controlling the power supply target and the power supply ratio of the energy storage battery based on the environmental parameter comprises:

determining the acting force level of the wind force parameter, and in response to the wind force parameter being at the first acting force level, controlling the energy storage battery to supply power to the stabilizer at the first power supply ratio, wherein the acting force level represents a degree to which the fishing rod is affected by external forces, and a greater impact indicates a higher acting force level; and in response to the wind force parameter being at the second acting force level and the wind direction parameter indicating that a direction of the hull needs to be adjusted, controlling the energy storage battery to stop supplying power to the stabilizer and controlling the energy storage battery to supply power to the trolling motor at the second power supply ratio, wherein the second acting force level is higher than the first acting force level.

3. The method of claim 2, wherein after determining the acting force level of the wind force parameter, and in response to the wind force parameter being at the first acting force level, controlling the energy storage battery to supply power to the stabilizer at the first power supply ratio, the method further comprises:

calculating a first horizontal tilt angle of the fishing rod based on the wind force parameter and the wind direction parameter, wherein the first horizontal tilt angle represents a deflection degree of the fishing rod in a horizontal direction caused by a wind force;

determining a control intensity of the stabilizer based on the first horizontal tilt angle, wherein a larger first horizontal tilt angle indicates a greater control intensity; and determining a first control torque of the stabilizer based on the control intensity and a control direction, and controlling the energy storage battery to supply power to the stabilizer at the first power supply ratio to make the stabilizer operate based on the first control torque, wherein the control direction is opposite to a direction indicated by the wind direction parameter.

4. The method of claim 2, wherein before controlling the energy storage battery to stop supplying power to the stabilizer, the method further comprises:

controlling the stabilizer to vibrate for a preset duration at a preset vibration intensity;

wherein after controlling the energy storage battery to supply power to the trolling motor at the second power supply ratio, the method further comprises:

calculating a target direction of the hull based on the wind direction parameter, and controlling the trolling motor to adjust a direction of the hull towards the target direction; and controlling the energy storage battery to stop supplying power to the trolling motor after the hull is adjusted to the target direction.

5. The method of claim 4, wherein calculating the target direction of the hull based on the wind direction parameter comprises:

obtaining a first direction that is the same as a wind direction indicated by the wind direction parameter and a second direction that is opposite to the wind direction indicated by the wind direction parameter based on the wind direction parameter;

calculating a first angle difference between a current direction of the hull and the first direction, and calculating a second angle difference between the current direction of the hull and the second direction; and determining a direction corresponding to a smaller angle difference of the first angle difference and the second angle difference as the target direction.

6. The method of claim 2, wherein the intelligent fishing rod system further comprises the trolling motor, and the environmental parameter comprises at least one of the wind force parameter and the wind direction parameter, the method further comprises:

determining the acting force level of the wind force parameter, and in response to the wind force parameter being at a third acting force level, sending an alert message to a terminal device of a user and executing an evacuating command, wherein the third acting force level is greater than the second acting force level, and the evacuating command is used to instruct the energy storage battery to supply power to the trolling motor at the second power supply ratio and to stop supplying power to the stabilizer; and continuously receiving the wind force parameter, and in response to the wind force parameter not being at the third acting force level and receiving a recovery signal sent by the terminal device, stopping executing the evacuating command.

7. A controller, comprising a processor, a memory, a communication interface, and one or more programs, wherein the controller is comprised in an intelligent fishing rod system, and the intelligent fishing rod system further comprises a fishing rod, a sensor module, a stabilizer, an energy storage battery, a hull, and a trolling motor, wherein the sensor module is configured to detect an environmental parameter, the environmental parameter comprises at least one of a wind force parameter and a wind direction parameter, the stabilizer is configured to stabilize the fishing rod, and the energy storage battery is configured to supply power to the sensor module, to the stabilizer, and to the controller, wherein the one or more programs are stored in the memory and configured to be executed by the processor to execute:

receiving the environmental parameter sent by the sensor module, and in response to not receiving a bite signal sent by the sensor module, controlling a power supply target and a power supply ratio of the energy storage battery based on the environmental parameter; and in response to receiving the bite signal sent by the sensor module, controlling the energy storage battery to supply power to the stabilizer and obtaining a drag force parameter sent by the sensor module, controlling the power supply target and the power supply ratio of the energy storage battery based on the environmental parameter and the drag force parameter, wherein the drag force parameter is obtained by detecting, by the sensor module, the fishing rod controlled by the stabilizer, and the drag force parameter comprises at least one of a horizontal drag force parameter and a vertical drag force parameter, and wherein in terms of controlling the power supply target and the power supply ratio of the energy storage battery based on the environmental parameter and the drag force parameter, the one or more programs are configured to be executed by the processor to execute:

determining an acting force level of the wind force parameter, and in response to the wind force parameter being at a first acting force level and the horizontal drag force parameter and the vertical drag force parameter being at the first acting force level, controlling the energy storage battery to supply power to the stabilizer at a first power supply ratio;

in response to the wind force parameter being at a second acting force level and the horizontal drag force parameter or the vertical drag force parameter being at the first acting force level, controlling the energy storage battery to supply power to the stabilizer at a third power supply ratio, wherein the third power supply ratio is greater than the first power supply ratio;

in response to the wind force parameter being at the first acting force level and the horizontal drag force parameter or the vertical drag force parameter being at the second acting force level, controlling the energy storage battery to supply power to the stabilizer at the third power supply ratio; and in response to the wind force parameter being at the second acting force level and the horizontal drag force parameter or the vertical drag force parameter being at the second acting force level, controlling the energy storage battery to supply power to the stabilizer at the third power supply ratio and to supply power to the trolling motor at a second power supply ratio.

8. The controller of claim 7, wherein the intelligent fishing rod system further comprises a hull and a trolling motor, and the environmental parameter comprises at least one of a wind force parameter and a wind direction parameter, wherein in terms of in response to not receiving the bite signal sent by the sensor module, controlling the power supply target and the power supply ratio of the energy storage battery based on the environmental parameter, the one or more programs are configured to be executed by the processor to execute:

determining the acting force level of the wind force parameter, and in response to the wind force parameter being at the first acting force level, controlling the energy storage battery to supply power to the stabilizer at the first power supply ratio, wherein the acting force level represents a degree to which the fishing rod is affected by external forces, and a greater impact indicates a higher acting force level; and in response to the wind force parameter being at the second acting force level and the wind direction parameter indicating that a direction of the hull needs to be adjusted, controlling the energy storage battery to stop supplying power to the stabilizer and controlling the energy storage battery to supply power to the trolling motor at the second power supply ratio, wherein the second acting force level is higher than the first acting force level.

9. The controller of claim 8, wherein after determining the acting force level of the wind force parameter, and in response to the wind force parameter being at the first acting force level, controlling the energy storage battery to supply power to the stabilizer at the first power supply ratio, the one or more programs are configured to be executed by the processor to further execute:

calculating a first horizontal tilt angle of the fishing rod based on the wind force parameter and the wind direction parameter, wherein the first horizontal tilt angle represents a deflection degree of the fishing rod in a horizontal direction caused by a wind force;

determining a control intensity of the stabilizer based on the first horizontal tilt angle, wherein a larger first horizontal tilt angle indicates a greater control intensity; and determining a first control torque of the stabilizer based on the control intensity and a control direction, and controlling the energy storage battery to supply power to the stabilizer at the first power supply ratio to make the stabilizer operate based on the first control torque, wherein the control direction is opposite to a direction indicated by the wind direction parameter.

10. The controller of claim 8, wherein before controlling the energy storage battery to stop supplying power to the stabilizer, the one or more programs are configured to be executed by the processor to further execute:

controlling the stabilizer to vibrate for a preset duration at a preset vibration intensity;

wherein after controlling the energy storage battery to supply power to the trolling motor at the second power supply ratio, the one or more programs are configured to be executed by the processor to further execute:

calculating a target direction of the hull based on the wind direction parameter, and controlling the trolling motor to adjust a direction of the hull towards the target direction; and controlling the energy storage battery to stop supplying power to the trolling motor after the hull is adjusted to the target direction.

11. The controller of claim 10, wherein in terms of calculating the target direction of the hull based on the wind direction parameter, the one or more programs are configured to be executed by the processor to execute:

obtaining a first direction that is the same as a wind direction indicated by the wind direction parameter and a second direction that is opposite to the wind direction indicated by the wind direction parameter based on the wind direction parameter;

calculating a first angle difference between a current direction of the hull and the first direction, and calculating a second angle difference between the current direction of the hull and the second direction; and determining a direction corresponding to a smaller angle difference of the first angle difference and the second angle difference as the target direction.

12. The controller of claim 8, wherein the intelligent fishing rod system further comprises the trolling motor, and the environmental parameter comprises at least one of the wind force parameter and the wind direction parameter, the one or more programs are configured to be executed by the processor to further execute:

determining the acting force level of the wind force parameter, and in response to the wind force parameter being at a third acting force level, sending an alert message to a terminal device of a user and executing an evacuating command, wherein the third acting force level is greater than the second acting force level, and the evacuating command is used to instruct the energy storage battery to supply power to the trolling motor at the second power supply ratio and to stop supplying power to the stabilizer; and continuously receiving the wind force parameter, and in response to the wind force parameter not being at the third acting force level and receiving a recovery signal sent by the terminal device, stopping executing the evacuating command.

13. A non-transitory computer-readable storage medium, storing a computer program used for electronic data interchange (EDI), wherein the computer program, when executed, causes a controller of an intelligent fishing rod system to execute:

receiving an environmental parameter sent by a sensor module of the intelligent fishing rod system, and in response to not receiving a bite signal sent by the sensor module, controlling a power supply target and a power supply ratio of an energy storage battery of the intelligent fishing rod system based on the environmental parameter, wherein the environmental parameter comprises at least one of a wind force parameter and a wind direction parameter; and in response to receiving the bite signal sent by the sensor module, controlling the energy storage battery to supply power to a stabilizer of the intelligent fishing rod system and obtaining a drag force parameter sent by the sensor module, controlling the power supply target and the power supply ratio of the energy storage battery based on the environmental parameter and the drag force parameter, wherein the drag force parameter is obtained by detecting, by the sensor module, a fishing rod of the intelligent fishing rod system controlled by the stabilizer, and the drag force parameter comprises at least one of a horizontal drag force parameter and a vertical drag force parameter, and wherein in terms of controlling the power supply target and the power supply ratio of the energy storage battery based on the environmental parameter and the drag force parameter, the controller is caused to execute:

determining an acting force level of the wind force parameter, and in response to the wind force parameter being at a first acting force level and the horizontal drag force parameter and the vertical drag force parameter being at the first acting force level, controlling the energy storage battery to supply power to the stabilizer at a first power supply ratio;

in response to the wind force parameter being at a second acting force level and the horizontal drag force parameter or the vertical drag force parameter being at the first acting force level, controlling the energy storage battery to supply power to the stabilizer at a third power supply ratio, wherein the third power supply ratio is greater than the first power supply ratio;

in response to the wind force parameter being at the first acting force level and the horizontal drag force parameter or the vertical drag force parameter being at the second acting force level, controlling the energy storage battery to supply power to the stabilizer at the third power supply ratio; and in response to the wind force parameter being at the second acting force level and the horizontal drag force parameter or the vertical drag force parameter being at the second acting force level, controlling the energy storage battery to supply power to the stabilizer at the third power supply ratio and to supply power to a trolling motor at a second power supply ratio.

14. The non-transitory computer-readable storage medium of claim 13, wherein the environmental parameter comprises at least one of a wind force parameter and a wind direction parameter, wherein in terms of in response to not receiving the bite signal sent by the sensor module, controlling the power supply target and the power supply ratio of the energy storage battery based on the environmental parameter, the controller is caused to execute:

determining the acting force level of the wind force parameter, and in response to the wind force parameter being at the first acting force level, controlling the energy storage battery to supply power to the stabilizer at the first power supply ratio, wherein the acting force level represents a degree to which the fishing rod is affected by external forces, and a greater impact indicates a higher acting force level; and in response to the wind force parameter being at the second acting force level and the wind direction parameter indicating that a direction of a hull needs to be adjusted, controlling the energy storage battery to stop supplying power to the stabilizer and controlling the energy storage battery to supply power to the trolling motor at the second power supply ratio, wherein the second acting force level is higher than the first acting force level.

15. The non-transitory computer-readable storage medium of claim 13, wherein after determining the acting force level of the wind force parameter, and in response to the wind force parameter being at the first acting force level, controlling the energy storage battery to supply power to the stabilizer at the first power supply ratio, the controller is caused to further execute:

calculating a first horizontal tilt angle of the fishing rod based on the wind force parameter and the wind direction parameter, wherein the first horizontal tilt angle represents a deflection degree of the fishing rod in a horizontal direction caused by a wind force;

determining a control intensity of the stabilizer based on the first horizontal tilt angle, wherein a larger first horizontal tilt angle indicates a greater control intensity; and determining a first control torque of the stabilizer based on the control intensity and a control direction, and controlling the energy storage battery to supply power to the stabilizer at the first power supply ratio to make the stabilizer operate based on the first control torque, wherein the control direction is opposite to a direction indicated by the wind direction parameter.

16. The non-transitory computer-readable storage medium of claim 13, wherein before controlling the energy storage battery to stop supplying power to the stabilizer, the controller is caused to further execute:

controlling the stabilizer to vibrate for a preset duration at a preset vibration intensity;

wherein after controlling the energy storage battery to supply power to the trolling motor at the second power supply ratio, the computer controller is caused to further execute:

calculating a target direction of a hull based on the wind direction parameter, and controlling the trolling motor to adjust a direction of the hull towards the target direction; and controlling the energy storage battery to stop supplying power to the trolling motor after the hull is adjusted to the target direction.

17. The non-transitory computer-readable storage medium of claim 16, wherein in terms of calculating the target direction of the hull based on the wind direction parameter, the controller is caused to execute:

obtaining a first direction that is the same as a wind direction indicated by the wind direction parameter and a second direction that is opposite to the wind direction indicated by the wind direction parameter based on the wind direction parameter;

calculating a first angle difference between a current direction of the hull and the first direction, and calculating a second angle difference between the current direction of the hull and the second direction; and determining a direction corresponding to a smaller angle difference of the first angle difference and the second angle difference as the target direction.

* * * * *